Sept. 15, 1936.                    R. F. PEO                     2,054,466
                          HYDRAULIC SHOCK ABSORBER
                     Filed Jan. 5, 1933            2 Sheets-Sheet 1
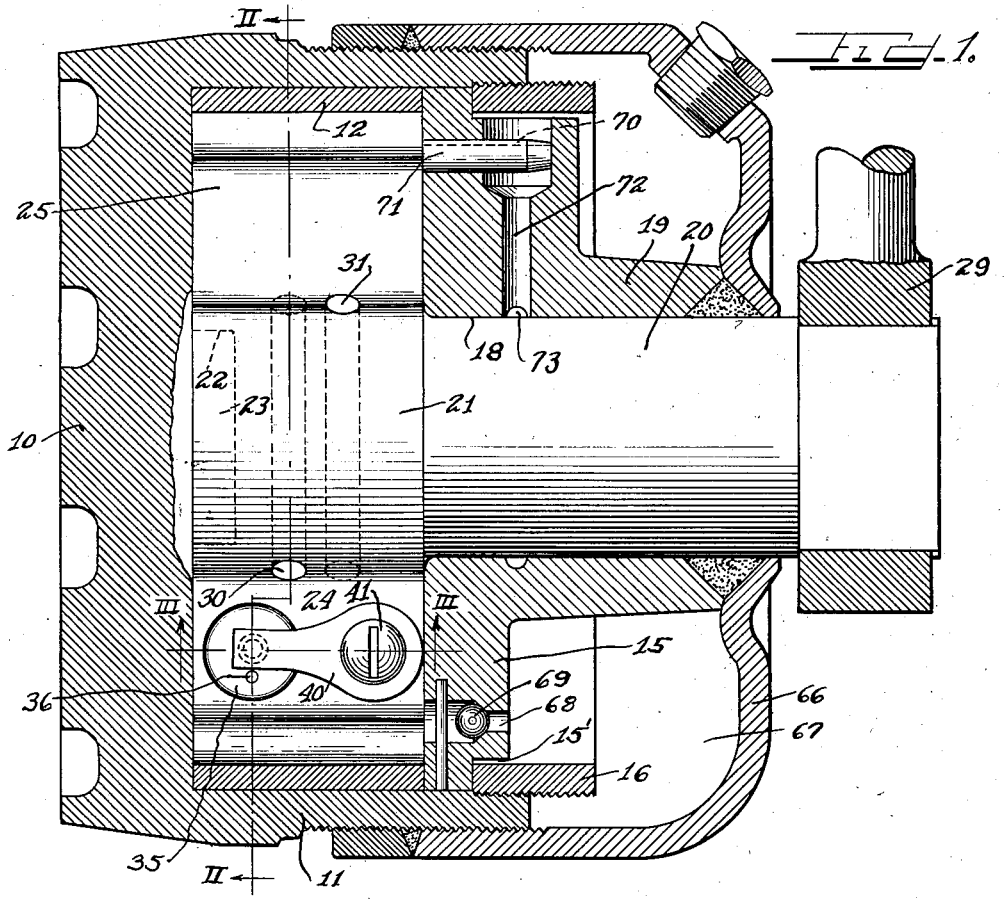
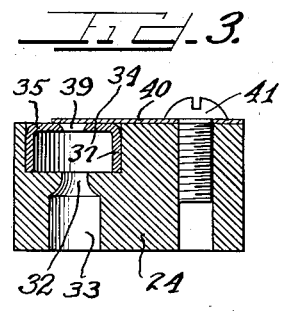
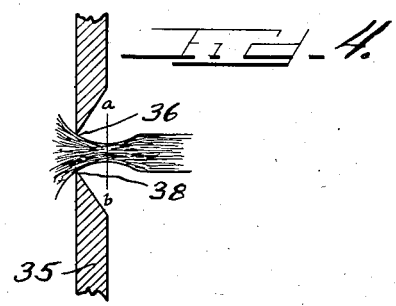
Inventor
Ralph F. Peo.
by Charles Hill
Attys.

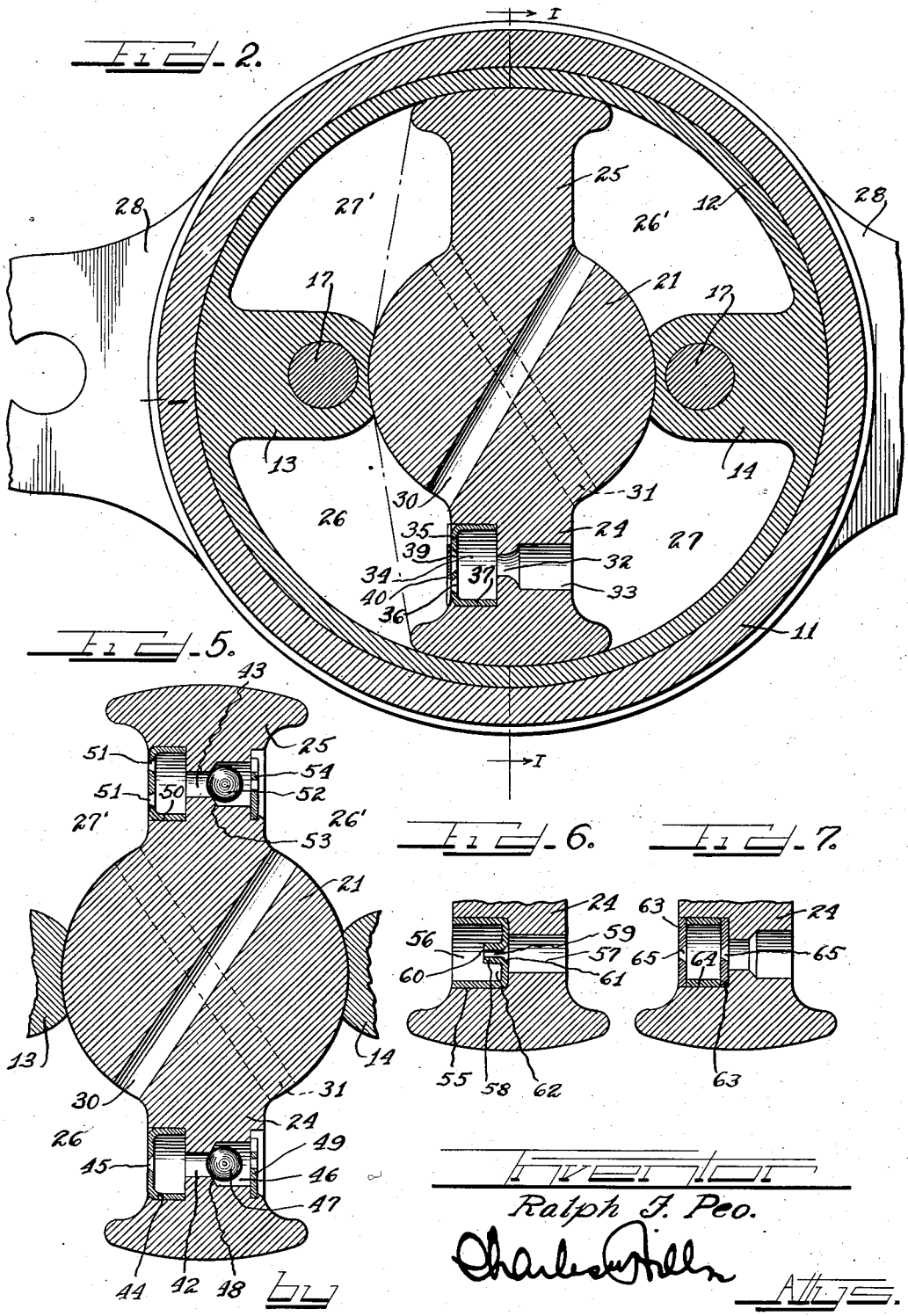

Patented Sept. 15, 1936

2,054,466

UNITED STATES PATENT OFFICE 2,054,466

HYDRAULIC SHOCK ABSORBER

Ralph F. Peo, Buffalo, N. Y., assignor to Houde Engineering Corporation, Buffalo, N. Y., a corporation of New York Application January 5, 1933, Serial No. 650,275

4 Claims. (Cl. 188—89)

This invention relates to hydraulic shock absorbers, particularly to shock absorbers for automotive vehicles, and in general, the object is to provide improved and simplified automatic regulation and metering of the bypassage flow of the fluid to control the shock absorber resistance accurately and efficiently without disturbance or interference by fluid temperature or viscosity variations and without the use of thermostat mechanism, and to produce an efficient cycle of operation in which the shock absorber resistance increases as and with increase of pressure to which the fluid is subjected particularly during the rebound stroke of the shock absorber piston element.

The important object and feature of the invention is the dependence solely on a properly designed orifice for metering and controlling the bypassage of fluid between the high pressure and low pressure chambers of the shock absorber.

In the construction of hydraulic shock absorbers orifices have been used for the bypassage of fluid but in providing such orifices no attention has apparently been given to the proper designing and dimensioning thereof for the most efficient functioning, the orifices heretofore provided being usually in the form of holes drilled to a diameter calculated to give the desired resistance to fluid flow. With such haphazard type or orifice the resistance to flow changes with variations in temperature or viscosity of the fluid which would disturb the shock absorbing characteristics of the shock absorber unless thermostat means were provided for compensating for such temperature or viscosity variations.

In accordance with my invention I provide an orifice so designed and dimensioned that the coefficient of discharge is low and practically independent of the viscosity of the fluid. A type of orifice which will give these desirable characteristics is the standard sharp edged orifice. The jet flowing through this type of orifice is contracted after leaving the orifice edge and the retardation or resistance to flow through the orifice is caused in greater part by this contraction, and the resistance to flow increases with the head or pressure applied to the fluid to impel it through the orifice. These orifice flow characteristics are very desirable in a hydraulic shock absorber for automotive vehicles as with the increasing pressure against the fluid to be displaced, particularly during rebound stroke of the shock absorber piston, the orifice flow contraction and therefore the orifice resistance will proportionately increase to maintain the proper shock absorber resistance.

On the accompanying drawings I have shown my invention applied in a well-known type of shock absorber. In the drawings Figure 1 is a diametral section of a hydraulic shock absorber taken on plane 1—1 of Figure 2, Figure 2 is a section on plane 2—2 of Figure 1, Figure 3 is a section on plane 3—3 of Figure 1, Figure 4 is an enlarged section of a particular type of orifice used, Figure 5 is a section similar to Figure 2 showing a modified form of by-pass control, Figure 6 is a section through a piston vane showing a modified form of orifice, and Figure 7 is a similar section showing a modified orifice arrangement.

The body of the shock absorber structure shown comprises the rear or base wall 10 having the peripheral cylindrical wall or flange 11 extending laterally therefrom to define a cylindrical space. Within the wall 11 and abutting thereagainst and against the base 10 is the ring 12 from which extend the diametrally opposite partition walls 13 and 14. The outer cylindrical wall or head 15 fits into the cylindrical wall 11 and abuts against the ring 12 and the partition walls 13 and 14 and has the annular recess 15' at its outer end for receiving the clamping ring 16 which has threaded engagement with the interior threads at the outer end of the wall 11, the head 15 thus being securely clamped in position. To securely hold the ring 12 and partitions 13 and 14 in place pins or keys 17 are used which extend through the partitions and into the base wall 10.

The head 15 has the bearing bore 18 which is continued through the lug or sleeve 19 extending outwardly from the head, and this bore journals the shaft 20 having at its inner end the cylindrical hub 21 which extends axially between the head 15 and the base wall 10 and has the cylindrical bearing pocket 22 for receiving the centering end bearing lug 23 extending from the base wall 10. Extending radially from opposite sides of the shaft hub are the piston members 24 and 25 whose outer ends fit against the ring 12 between the partition walls 13 and 14, the piston members extending axially between the head 15 and the base wall 10. The opposed ends of the partition walls are of cylindric surface to engage against the shaft hub with bearing fit the the piston members, the partition walls and the ring 12 dividing the interior of the shock absorber into the high pressure working chambers 26 and 26' and the low pressure chambers 27 and 27'.

The base wall 10 has ears 28 extending therefrom by means of which the shock absorber body may be secured to a support as for example the chassis of an automotive vehicle, and the shaft at its outer end has secured thereto an arm 29 whose end is adapted for connection as for example with the axle of the automotive vehicle so that as the vehicle travels and the vehicle body and axles move relatively, the shaft will oscillate the piston members against the resistance of a fluid such as oil in the working chambers.

The high pressure chambers 26 and 26' are always in communication with each other through a duct 30 extending diametrally through the hub 21 and the low pressure chambers 27 and 27' are always in communication through a duct 31 through the hub, the ends of these ducts being close to the bases of the piston or vane members 24 and 25.

In the arrangement of Figures 1, 2, and 3 one of the piston or vane members is provided with a fluid bypassageway extending transversely therethrough, this bypassageway 32 having the enlarged end 33 opening to the low pressure chamber and the enlarged end 34 forming a cylindrical pocket on the high pressure side of the vane. In the outer end of the pocket is secured a wall or disc 35 through which extends a metering orifice 36 for restricting and metering the flow of fluid from the high pressure chambers to the low pressure chambers during operation of the shock absorbers. The disc is preferably of some suitable metal and as shown is held in the pocket 34 by the annular flange 37 extending therefrom, a cup-shaped structure being thus provided through whose bottom extends the orifice 36.

The wall 35 through which the orifice extends is comparatively thin but is rigid and inflexible and the orifice shown is of the so-called standard sharp edged type shown more in detail in Fig. 4 with its sharp edge 38 in the plane of the outer face of the wall 35 so that the coefficient of discharge of the fluid from the high pressure chambers to the low pressure chambers will be substantially independent of the viscosity of the fluid. In other words with this particular type of orifice or other shape orifice having the same characteristics as the type shown, the reaction or resistance to flow through the orifice measured in the pressure of the fluid under a definite displacement per unit of time will, for all practical purposes, remain unchanged during variation of the viscosity of the fluid. Referring to Figure 4 the reaction or resistance of the sharp edge orifice is due in greater part to the formation of the neck or contraction a—b of the fluid stream after leaving the sharp edge, the resistance to flow increasing with increasing contraction. The degree of contraction is also apparently dependent upon the viscosity of the fluid flowing through the orifice, the contraction and consequently the resistance to flow increasing with decreasing viscosity and decreasing with increasing viscosity, the orifice flow thus being self-compensating to maintain substantially constant coefficient of discharge independent of viscosity change.

The contraction and consequently the flow resistance through the orifice will increase with increase of the head or pressure which tends to force the fluid through the orifice. Such functioning of the orifice is very desirable in the operation of the shock absorber as increased opposition to fluid flow will be built up in proportion to the increasing rebound energy tending to rapidly move the piston for expulsion of the fluid through the orifice, and the shock absorber resistance will be more proportionate to the severity of road conditions.

During the high compression stroke of the piston structure occurring during rebound or movement of the chassis away from the axle, the resistance and shock absorption is controlled entirely by the flow through the restricted orifice 36. During the non-compression stroke of the piston occurring when the chassis and axle approach each other the bypass restriction is considerably less. A large orifice or port 39 communicates with the bypassageway 32 and as shown in Figures 1, 2, and 3 this port may be located in the wall 35 at one side of the orifice 36. A suitable valve is provided to check flow through this port during the pressure stroke of the piston structure. I have shown a reed valve 40 secured as by a screw 41 against the face of the piston vane adjacent to the bypass pocket 34 with its free end of reduced width to extend over the outer end of the port 39. During the pressure stroke this port will be closed by the valve reed and the only flow must be through the metering orifice 36. During the low compression stroke of the piston structure the fluid pressure will raise the valve so that flow may be both through the orifice and the port. The section 32 of the bypassageway is comparatively large and will offer very little resistance to the low pressure flow of fluid. The port 39 being of larger diameter than the orifice 36 will offer much less obstruction and in order that the low compression flow resistance through the port 39 may compensate for variation in viscosity of the fluid the port may be beveled away at its outer side so as to present, in effect, a sharp edge orifice to the low compression flow.

Figure 5 shows a modified bypassage arrangement. A restricted orifice controlled bypass 42 is provided in one of the piston vanes for flow of fluid during the high pressure stroke and in the other vane a less restricted bypassage 43 is provided for the low pressure fluid flow. In the enlarged end of the bypassageway 42 is seated the orifice containing member which is shown in the form of a sheet metal cup 44, the base wall of the cup being presented to the adjacent high pressure chamber 26 and having the knife edge orifice 45 therethrough with its knife edge in the outer face of the cup bottom wall. The enlargement 46 at the other end of the bypassageway forms a valve chamber for a ball valve 47 adapted to engage the seat 48 to prevent flow through the bypassageway from the low pressure chamber 27' to the high pressure chamber 26', the ball being retained in the valve chamber by a spider or grill wall 49.

The bypassageway 43 terminates in a pocket in which is seated the orifice structure 50 presenting its outer wall to the low pressure chamber 27 and this wall has a large orifice or a number of smaller orifices 51 therethrough. The other end of the bypassageway 43 is expanded to form a valve chamber for the ball valve 52 for seating against the seat 53 to prevent flow from the high pressure chamber 26 to the low pressure chamber 27, a grill or spider 54 confining the ball in the valve chamber. When the piston structure rotates for a compression stroke the check ball 52 will be held against its seat to close the bypassageway 43 and the only flow from the high pressure chambers to the low pressure chambers can then be through the metering orifice 45 and past the ball check 47. During a low pressure stroke the ball 47 is seated to close the bypassageway 42 so that the fluid flow from the low pressure chambers to the high pressure chambers is through the ports 51 and the bypassageway 43. As in the arrangement of Figures 1 and 2 the high pressure chambers 26 and 26' are connected by the duct 30 through the piston hub and the low pressure chambers 27 and 27' are connected by the duct 31.

In order that the resistance to flow through the ports 51 may be unaffected by viscosity variations these ports may be beveled on their inner sides so as to present a knife edge to the flow from the low pressure chamber 27 to the high pressure chamber 26. The arrangement of Figures 1 and 2 is simpler and more economically manufactured as only one bypass is necessary through the piston structure.

On Figure 6 a modified type of orifice is shown. A cylindrical cup 55 of suitable sheet metal is inserted in the pocket 56 at the end of the bypassage 57 through the piston vane 24, the bottom of the cup being deflected inwardly into the cup body to form a tubular orifice nipple 58 having the restricted passageway 59 therethrough and presenting a sharp orifice edge 60 at its outer end and a rounded approach edge 61 at its other end. Fluid entering the cup from the high pressure chamber 26 is deflected for reverse flow through the annular space 62 surrounding the nipple 58 before it passes around the sharp orifice edge 60 for flow through the passageway 59. This sharp edge causes contraction of the fluid stream within the passage 59 and introduces the resistance or reaction in the flow. The coefficient of discharge of an orifice structure of this type is considerably less than that of the type of orifice shown in Figure 4. With the well rounded approach end 61 at the inner end of the passageway 59 comparatively lower resistance is introduced in the flow of the fluid from the low pressure chamber 27 to the high pressure chamber 26.

Figure 7 shows a further modified arrangement. Here two or more orifice members which may be in the form of discs 63 are arranged in tandem, the discs being held properly spaced by a ring 64. Each disc has a knife edge orifice 65 therethrough and as the fluid passes from the high pressure chamber 26 to the low pressure chamber 27 the fluid stream will be successively contracted as it passes serially through the orifices so that the net coefficient of discharge through the orifices is materially reduced and such coefficient will not be influenced by variations in viscosity.

In the various arrangements shown the fluid approach to the orifices should be as uninterrupted and smooth as possible and the orifices should also be sufficiently displaced from the sides of the bypassageway in order that the most efficient jet contraction may result for the most efficient flow control. With the orifices thus carefully designed and located compensation for fluid viscosity variations is automatically compensated for and the coefficient of discharge is practically independent of the viscosity and special apparatus such as thermostatically controlled valves will be unnecessary and the cost of manufacture of shock absorbers is materially reduced. Furthermore the resistance or reaction to flow through these properly designed orifices increases and decreases as and with increase or decrease of the impelling pressure exerted against the fluid during operation of the shock absorber so that shocks no matter how severe or rapid are always under full control and are efficiently absorbed.

As shown on Figure 1 a casing or cap 66 is applied to the frame 11 to provide a replenishing chamber 67. Communicating with the lower ends of each of the chambers 26 and 27 is a replenishing passageway 68 controlled by a ball valve 69, the valve closing the passageway during compression of the fluid in the respective chambers. The upper end of each of the chambers 26' and 27' communicates with a restricted passageway 70 which, as shown, is in the form of a slot cut in a plug 71 extending through the head 15. At each plug a well structure 72 is provided whose walls form part of the head 15, the upper ends of the walls being shown above the passageway 70 and the bottoms of the wells communicating with an annular channel 73 formed in the bearing 19. Any fluid which may leak out between the piston hub and its shaft and the bearing 19 will be collected by the channel and will rise in the wells and keep the respective relief channels 70 covered and sealed against the return of air to the working chambers at the top thereof.

I have shown practical and efficient embodiments of the various features of my invention but I do not desire to be limited to the exact construction and arrangement shown and described as changes and modifications may be made without departing from the scope of the invention as defined in the appended claims.

I claim as my invention:

1. In a hydraulic shock absorber, a housing enclosing a high pressure chamber and a low pressure chamber, a piston operable to displace fluid in said chambers, a passage for the flow of fluid from the high pressure chamber to the low pressure chamber and a separate passage for the flow of fluid from the low pressure chamber to the high pressure chamber, each passage having a sharp edged orifice for metering the flow therethrough and a check valve for preventing flow in reverse direction.

2. In a hydraulic shock absorber, a housing enclosing a high pressure chamber and a low pressure chamber, a piston operable to displace fluid in said chambers, a passage for the flow of fluid from the high pressure chamber to the low pressure chamber and a separate passage for the flow of fluid from the low pressure chamber to the high pressure chamber, each passage having a sharp edged orifice at one end thereof for metering the flow therethrough and a check valve at the other end thereof for preventing flow therethrough in reverse direction.

3. In a hydraulic shock absorber, a housing enclosing a high pressure chamber and a low pressure chamber, a piston operable to displace fluid in said chambers, means defining a path for the flow of fluid from the high pressure chamber to the low pressure chamber, means defining a separate path for the flow of fluid from the low pressure chamber to the high pressure chamber, a rigid disk interposed in each path and provided with a sharp edged orifice for metering the flow through said paths independently of fluid viscosity change, and means in each path displaced from the orifice therein for preventing reverse flow through said paths.

4. In a hydraulic shock absorber, a housing enclosing a high pressure chamber and a low pressure chamber, a piston operable to displace fluid in said chamber, a passage for the flow of fluid from the high pressure chamber to the low pressure chamber, and a separate passage for the flow of fluid from the low pressure chamber to the high pressure chamber, each passage having means providing an orifice for a restricted flow of fluid through said passage at a rate substantially independent of viscosity changes in the fluid and having means for preventing flow therethrough in reverse direction.

RALPH F. PEO.